(12) United States Patent
Ando et al.

(10) Patent No.: US 7,137,252 B2
(45) Date of Patent: *Nov. 21, 2006

(54) VARIABLE NOZZLE CONTROL APPARATUS OF TURBOCHARGER

(75) Inventors: Yoshiyuki Ando, Yokohama (JP); Haruo Saito, Yokohama (JP); Takaaki Sekine, Yokohama (JP)

(73) Assignee: Jidosha Denki Kogyo Co., Ltd., Yokohama (JP)

( * ) Notice: Subject to any disclaimer, the term of this patent is extended or adjusted under 35 U.S.C. 154(b) by 170 days.

This patent is subject to a terminal disclaimer.

(21) Appl. No.: 10/875,825

(22) Filed: Jun. 25, 2004

(65) Prior Publication Data

US 2005/0022524 A1 Feb. 3, 2005

Related U.S. Application Data

(63) Continuation-in-part of application No. 10/776,348, filed on Feb. 12, 2004, now Pat. No. 7,024,856.

(30) Foreign Application Priority Data

Feb. 13, 2003 (JP) .......................... P2003-034633
Jun. 26, 2003 (JP) .......................... P2003-182500

(51) Int. Cl.
*F02D 23/00* (2006.01)
*F02B 37/24* (2006.01)

(52) U.S. Cl. ..................................... 60/602
(58) Field of Classification Search .......... 60/600–603; 415/150; F02B 37/24
See application file for complete search history.

(56) References Cited

U.S. PATENT DOCUMENTS

| | | | | |
|---|---|---|---|---|
| 6,000,221 A | | 12/1999 | Church et al. .............. 60/602 |
| 6,062,025 A | * | 5/2000 | Okada et al. .............. 60/602 |
| 6,067,798 A | * | 5/2000 | Okada et al. .............. 60/602 |
| 6,233,934 B1 | | 5/2001 | Church et al. .............. 60/602 |
| 6,354,269 B1 | | 3/2002 | Saito et al. | |
| 6,652,414 B1 | * | 11/2003 | Banks, III .............. 60/602 |
| 2002/0100278 A1 | | 8/2002 | He et al. .............. 60/602 |
| 2003/0185672 A1 | * | 10/2003 | Suganami et al. ........ 415/150 |
| 2004/0000143 A1 | * | 1/2004 | Ahmad .............. 60/600 |
| 2004/0011035 A1 | * | 1/2004 | Arnold .............. 60/602 |
| 2004/0182079 A1 | | 9/2004 | Akao et al. | |

FOREIGN PATENT DOCUMENTS

EP 1304462 A2 4/2003

(Continued)

*Primary Examiner*—Thai-Ba Trieu
(74) *Attorney, Agent, or Firm*—McGinn IP Law Group, PLLC

(57) ABSTRACT

The invention provides a variable nozzle control apparatus for a turbocharger in an engine comprising: a variable nozzle having a vane; an engine ECU for identifying an operating situation of the engine by detected outputs of sensors in the engine and outputting a control signal; and an electronic control actuator for controlling an opening of the vane in response to the control signal transmitted from the engine ECU, wherein the electronic control actuator includes an electronic control circuit section for receiving an opening indication information of the vane from the engine ECU and outputting an output signal; a driving section for receiving the output signal from the electronic control circuit and driving the vane of the variable nozzle through an output shaft; and an angle sensor for detecting a rotation angle of the output shaft to output an actual angle signal of the output shaft to the electronic control circuit.

16 Claims, 6 Drawing Sheets

FOREIGN PATENT DOCUMENTS

| | | |
|---|---|---|
| JP | 2001-107738 | 4/2001 |
| WO | WO 03/036062 A1 | 5/2003 |

\* cited by examiner

VARIABLE NOZZLE CONTROL APPARATUS OF TURBOCHARGER

The present application is a CIP application of U.S. patent application Ser. No. 10/776,348, filed on Feb. 12, 2004 now U.S. Pat. No. 7,024,856, the entire contents of which are incorporated herein by reference.

The present application is based on Japanese Patent Applications No. 2003-34633 and No. 2003-182500, the entire contents of which are incorporated herein by reference.

BACKGROUND OF THE INVENTION

1. Field of the Invention

The present invention relates to a variable nozzle control apparatus of a turbocharger for controlling the opening of the vane of a variable nozzle of a turbocharger mounted on a car by means of an electronic control actuator in response to a control signal transmitted from an engine ECU.

2. Related Art

Conventionally, a technique for controlling the opening of the vane of a variable nozzle of a turbocharger mounted on a car of this type has a structure shown in FIG. 8, for example.

Description will be given to the structure. 1 denotes an engine ECU which is mainly constituted by a microcomputer including a CPU, an ROM, an RAM and an I/O circuit which are well known. The engine ECU 1 includes an electronic control throttle valve capable of variably regulating the amount of air taken into an internal combustion engine (engine) and serves to carry out an operation for opening and closing the electronic control throttle valve. The engine ECU 1 inputs the detection signals of a water temperature sensor, a rotation sensor and a load sensor which are provided in the engine (not shown), and detects an air-fuel ratio, an engine water temperature, an engine speed, an intake air amount and a fuel injection amount. 2 denotes a duty solenoid valve which is provided on the air intake tube side of the engine and serves to introduce air from the atmosphere. The duty solenoid valve 2 regulates an air pressure by an actuator, for example, a negative pressure actuator 3 so that an opening thereof is regulated and the amount of the air taken into the engine is regulated. Moreover, the duty solenoid valve 2 is provided among a pressure chamber, a negative pressure chamber and an atmospheric pressure chamber in the engine and is operated upon receipt of a control signal from the engine ECU 1. On the other hand, the negative pressure chamber of the engine receives and regulates a negative pressure from a vacuum pump 4, thereby operating the negative pressure actuator 3. The vacuum pump 4 circulates oil to carry out an operation. 5 denotes a turbocharger to be a so-called supercharging system of an internal combustion engine which controls the opening of a variable nozzle for causing the flow velocity of an exhaust gas to be variable which is provided in the turbocharger 5 by the operation of the negative pressure actuator 3. In the drawing, 6 denotes a pressure sensor which is provided with a hose 6a placed in the exhaust gas flow path of the turbocharger 5, and the detection signal of the pressure sensor 6 is introduced into the engine ECU 1 through a communication line 6b.

Moreover, another example in the conventional art includes a variable nozzle turbocharger control apparatus of an internal combustion engine which has been disclosed in JP-A-2001-107738, and FIG. 9 shows a structure thereof.

Description will be given to the structure. 7 denotes a turbocharger comprising a center housing, a compressor housing and a turbine housing.

In the turbocharger 7, an air intake inlet port 7a for introducing air and a compressed air supply hole 7d for supplying compressed air by the turbocharger 7 to the engine 8 are provide. Further, an exhaust gas sucking port 7c and an exhaust gas outlet port 7b for discharging the exhaust gas are provided in the turbocharger 7.

In the compressor housing, the air intake inlet port 7a for introducing air to be supplied to the combustion chamber of an engine 8 is provided in a portion positioned on the opposite side of the center housing. The turbine housing is attached to the other end side of the center housing, and an exhaust gas is sprayed onto the turbine housing and is then fed to a catalyst through the exhaust gas outlet port 7b in the portion positioned on the opposite side of the center housing in the turbine housing. A variable nozzle (not disclosed) provided in the turbocharger 7 is disposed between the center housing and the turbine housing. 9 denotes a stepping motor. By the driving operation of the stepping motor 9, an operating piece 10 is operated to press ring plates provided in the variable nozzles in the same direction, thereby regulating the size of a clearance between the vanes of the mutual variable nozzles. Thus, the flow velocity of the exhaust gas sprayed onto a turbine wheel is regulated. 11 denotes an ECU (electronic control unit) of the engine which serves to input the detected outputs of various sensors provided in the engine, to identify the operation state of the engine based on the detected outputs and to control the driving operation of the stepping motor 9, thereby controlling the opening of the vane of each of the variable nozzles to regulate the flow velocity of the exhaust gas sprayed onto the turbine wheel. Consequently, the amount of air to be fed forcibly for combustion is also regulated.

In the drawing, 12 denotes a radiator which is connected to the engine 8. The cooling water of the engine 8 is circulated in the radiator 12 and is thus cooled. 13 denotes a heater connected to the engine 8 in which the cooling water is heated so that warm air is fed into the interior of the car.

According to the conventional art, the whole position of the variable nozzle is set to be the initial position of the variable nozzle at time of the generation of the abnormality of the variable nozzle turbocharger control apparatus of the internal combustion engine, cold starting, the operation of a heater or idling. Consequently, precision in the control of the position of each nozzle vane in the vicinity of a full-open position can be enhanced, and furthermore, a controllability can be improved in a high rotation and low load operation state.

Since the conventional art has the structure described above, there are the following problems.

More specifically, in the former case of the conventional art, a control signal is generated from the engine ECU 1 and operates the negative pressure actuator 3 through the duty solenoid valve 2, thereby controlling the opening of the variable nozzle coupled to a link mechanism including a lever and a rod in order to control the opening of the variable nozzle provided in the turbocharger 5. The microcomputer constituting the engine ECU 1 is to calculate an air intake pressure, that is, a boost pressure in the supply of air to be taken into the engine to the air intake path. A data map having an engine rotation signal set to be an X axis, a fuel injection amount set to be a Y axis and a target boost pressure set to be a Z axis is stored, and a water temperature signal, a rotation signal and a load signal which are input from the sensor of the engine are read and a target boost pressure suitable for a signal amount is calculated. Furthermore, an actual boost pressure is detected from the pressure sensor 6 to operate the engine ECU 1 in response to an output signal. Accordingly, there is a problem in that the duty solenoid valve 2 and the negative pressure actuator 3 are caused to generate a misarrangement in an operation by precision in the sensor, a temperature drift or the linear interpolation computing error of the data map and the opening of the variable nozzle cannot be controlled properly.

In particular, the position of the negative pressure actuator 3 is determined by a regulated negative pressure amount and the spring pressure of a return spring. There is a problem in that the control software of the engine ECU 1 for carrying out a control operation to have an optimum value, and furthermore, for executing a deciding operation when the negative pressure actuator 3 requires a positive pressure and a negative pressure and the opening of the variable nozzle is improper has a load hysteresis increased remarkably and cannot exhibit a resolution.

Moreover, the engine ECU 1 and the duty solenoid valve 2 are provided in an interior and an engine room, respectively. A control signal line led from the engine ECU 1 to the duty solenoid valve 2 and the negative pressure actuator 3 is long and congested, and a noise is apt to be generated. For this reason, a countermeasure is to be taken against a noise, for example, the control signal line is to be shielded. Furthermore, the specification of the design of the duty solenoid valve 2 is complicated.

In addition, the duty solenoid valve 2 is connected to the negative pressure chamber of the negative pressure actuator 3 through the hose 3a, the vacuum pump 4 to be rotated by the engine is connected to the duty solenoid valve 2, and the opening of the variable nozzle communicating with the atmosphere is constituted by mechanical devices, that is, the negative pressure actuator 3 through the hose 3a. Consequently, there is a problem in that the hose 3a, and furthermore, the vacuum pump 4 are required, resulting in an increase in the size and complexity of a whole system.

In the latter case of the conventional art, as described above, the variable nozzle to be operated by the operating piece 10 is provided in the path for the exhaust gas to be sprayed onto the turbine wheel. The variable nozzle is opened and closed by the ring plate. In the variable turbocharger control apparatus of the internal combustion engine for regulating the flow rate of the exhaust gas, consequently, the initial position of the variable nozzle is determined and the opening of the vane of the variable nozzle is controlled at time of the generation of the abnormality of the variable nozzle turbocharger control apparatus of the internal combustion engine, cold starting, the operation of the heater or the idling of the internal combustion engine. Moreover, the driving operation of the vane of the variable nozzle is carried out by the rotating operation of the stepping motor 9. Consequently, the latter case has almost the same problems as those of the former case in the conventional art.

Thus, in the second example of the conventional art, the opening degree of the vane is identified and determined uniformly based on the initial position of the variable nozzle. Any offset control cannot be performed even in a case that the opening of the vane is shifted from the target opening degree. Therefore, it is difficult to control the position of the nozzle vane suitably in real time.

SUMMARY OF THE INVENTION

The invention has a first object to cause the system or apparatus to comprise an electronic control actuator, to control the electronic control actuator through a control signal line from an engine ECU, to control the opening of the vane of a variable nozzle provided in a turbocharger and to simply calculate the vane opening target position of the variable nozzle by the electronic control actuator to carry out an adaptation and a control to the actual opening position of the valve of the variable nozzle by controlling the position of the nozzle vane suitably in real time, thereby reducing the load of the software of the engine ECU, eliminating various hoses, and furthermore, forming a control signal line which does not require a countermeasure to be taken against a noise, mounting the electronic control actuator on the turbocharger to reduce a size, automatically deciding whether the opening of the vane of the variable nozzle is suitable or carrying out a comparison processing, enhancing a resolution, and controlling the opening of the vane of the variable nozzle by the electronic control actuator which can be controlled by a feedback signal.

In the driving operation of the system or apparatus, usually, the vane of the variable nozzle is operated within a partial operating angle range in a full operating region. Accordingly, soot adheres to or stays on the surface of a nozzle ring within the operating angle range other than the normal operating region of the vane of the variable nozzle. The invention has a second object to operate the vane to a full open position via a full closing position at least once in the full operating region of the vane of the variable nozzle by status indication information transmitted from the engine ECU based on the stop of an engine which is carried out by the OFF operation of an ignition switch, thereby executing so-called soot sweeping.

In order to attain the objects, the invention has been made and has the following structures and devices.

A first aspect of the invention is directed to a variable nozzle control apparatus of a turbocharger comprising an electronic control actuator for inputting detected outputs from various sensors provided in an engine including a turbocharger having a variable nozzle and controlling an opening of a vane of the variable nozzle of the turbocharger in response to a control signal transmitted from an engine ECU for identifying an operating situation of the engine by the detected outputs of the sensors, wherein the electronic control actuator has a motor section to be a driving source, an output shaft coupled to the motor section through a speed reduction mechanism and coupled to the vane of the variable nozzle of the turbocharger, an angle sensor for detecting a rotation angle of the output shaft to output an actual angle signal of the output shaft, a motor driver for outputting a driving signal to drive the motor section, an angle signal converting device for converting opening indication information of the vane of the variable nozzle which is transmitted from the engine ECU into a target angle signal of the output shaft, a comparing device for comparing the target angle signal of the output shaft which is transmitted from the angle signal converting device with the actual angle signal of the output shaft which is transmitted from the angle sensor, thereby outputting an indication signal corresponding to a difference between both of the signals, a calculating device for carrying out a calculation processing over the indication signal transmitted from the comparing device, and a motor driving logic generating device for inputting an output signal transmitted from the calculating device to the motor driver.

A second aspect of the invention is directed to a variable nozzle control apparatus of a turbocharger comprising an electronic control actuator for inputting detected outputs from various sensors provided in an engine including a turbocharger having a variable nozzle and controlling an opening of a vane of the variable nozzle of the turbocharger in response to a control signal transmitted from an engine ECU for identifying an operating situation of the engine by the detected outputs of the sensors, wherein the electronic control actuator has a motor section to be a driving source, an output shaft coupled to the motor section through a speed reduction mechanism and coupled to the vane of the variable nozzle of the turbocharger, an angle sensor for detecting a rotation angle of the output shaft to output an actual angle signal of the output shaft, a motor driver for outputting a driving signal to drive the motor section, an angle signal converting device for converting opening indication information of the vane of the variable nozzle which is transmitted from the engine ECU into a target angle signal of the output shaft, a comparing device for comparing the target angle signal of the output shaft which is transmitted from the angle signal converting device with the actual angle signal of the output shaft which is transmitted from the angle sensor, thereby outputting an indication signal corresponding to a difference between both of the signals, a calculating device for carrying out a calculation processing over the indication signal transmitted from the comparing device, a motor driving logic generating device for introducing an output signal transmitted from the calculating device into the motor driver, a wiping command device for outputting a command signal to execute a wiping operation for causing the vane to be stopped in a full open position via a full closing position at least once in a full operating region of the vane of the variable nozzle by status indication information transmitted from the engine ECU based on a stop of the engine by an OFF operation of an ignition switch, and a wiping processing device for introducing the command signal of the wiping command device into the motor driving logic generating device.

In the invention, a communication signal converting device may be formed for converting the actual angle signal to an actual vane opening signal and sending the actual vane opening signal to the engine ECU.

In the invention, the wiping processing device may introduce the command signal into the motor driving logic generating device through a change-over switch.

DETAILED DESCRIPTION OF THE PREFERRED EMBODIMENTS

Embodiments of a variable nozzle control apparatus of a turbocharger according to the invention will be described below in detail with reference to the accompanying drawings.

Figure 1:
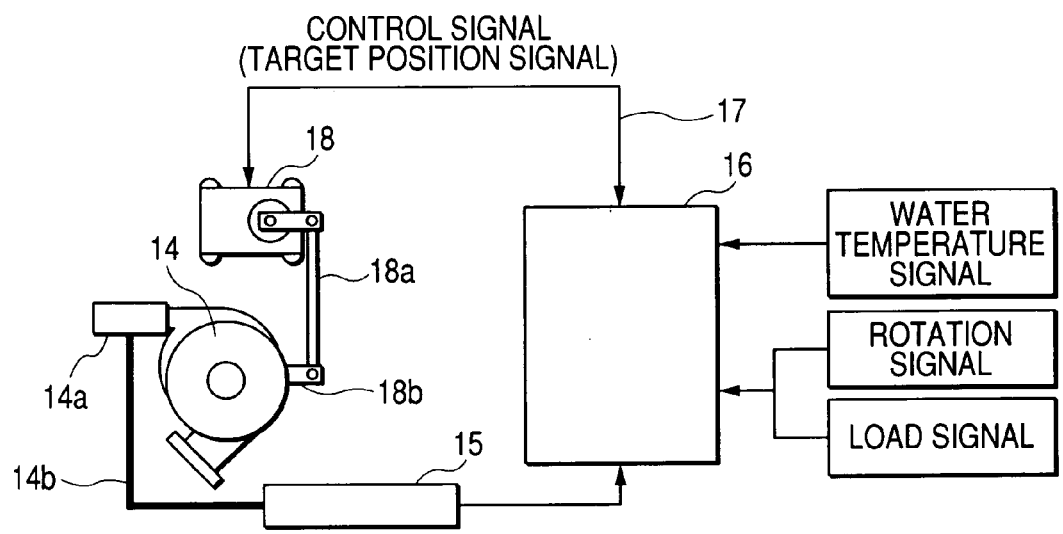
FIG. 1 is a diagram showing the structure of a variable nozzle control apparatus of a turbocharger according to a first embodiment of the invention.

FIG. 1 is a diagram showing a structure according to the invention. Description will be given to the structure.

14 denotes a turbocharger to be a system for supercharging intake air to an engine, which is provided with a compressor having a compressor wheel and a turbine (not shown) having a turbine wheel of the turbocharger coupled by a rotor shaft coaxially with the compressor and rotated by an exhaust gas. A pressure sensor 15 for detecting an air intake pressure of the intake air, that is, a boost pressure is connected to an air intake path 14a of the turbocharger 14 through a hose 14b. Moreover, a variable nozzle member is provided in the turbine of the turbocharger 14 in order to surround the turbine wheel.

16 denotes an engine ECU for introducing a water temperature signal, a rotation signal and a load signal, that is, detected outputs from various sensors provided in the engine, for example, a water temperature sensor for detecting the water temperature of the engine, a rotation number sensor for detecting an engine speed and outputting a pulse signal at a constant crank angle, and an accelerator sensor for detecting an intake air amount obtained by an air flow meter and a stepping amount of an accelerator pedal obtained by a driver, thereby calculating a load amount respectively.

In some cases, there are also provided an oxygen sensor for outputting a voltage signal to be varied depending on the oxygen concentration of an exhaust gas and a cylinder internal pressure sensor for detecting a pressure in an engine combustion chamber, which is not shown in FIG. 1.

The operation state of an engine is identified based on these detected outputs to control the driving operation of an electronic control actuator 18 through a control signal line 17. The electronic control actuator 18 has a lever 18a and a rod 18b coupled thereto and controls a variable nozzle member (not shown) provided in the turbocharger 14 by the operation.

Figure 2:
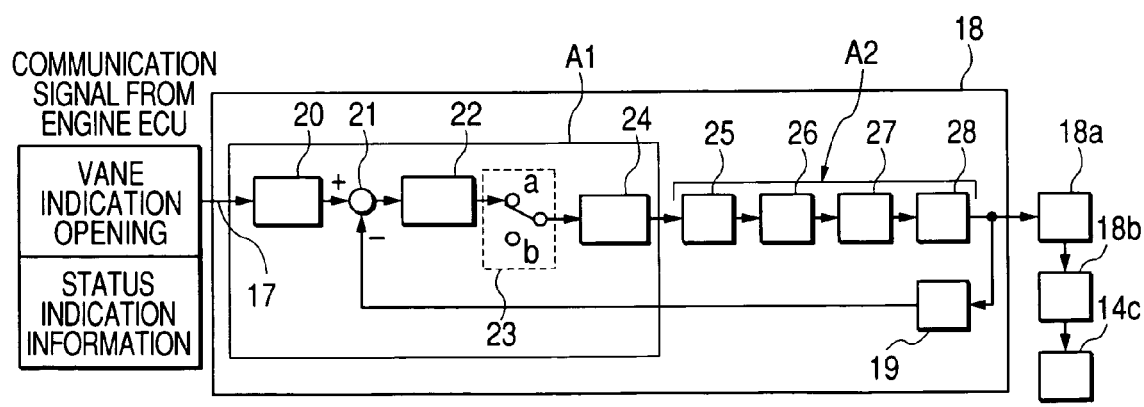
FIG. 2 is a block diagram showing the variable nozzle control apparatus of the turbocharger according to the invention, illustrating a first embodiment of an electronic control actuator.

As shown in FIG. 2, the electronic control actuator 18 is generally constituted by an electronic control circuit section A1 and a driving section A2 which is controlled to be driven by the electronic control circuit section A1, and has an angle sensor 19 for detecting the rotation angle of the output shaft of the driving section A2. The electronic control circuit section A1 is connected to the engine ECU 16 through the control signal line 17. The engine ECU 16 carries out a calculation processing control by information (signals) transmitted from sensors provided in various engines.

The electronic control actuator 18 is attached to the end of the cylinder block of the engine, for example. Alternatively, the electronic control actuator 18 may be attached to the turbocharger 14.

First Embodiment

Next, the first embodiment of the variable nozzle control apparatus of the turbocharger according to the invention and an operation thereof will be described with reference to FIGS. 2 and 3.

FIG. 2 is a block diagram showing the variable nozzle control apparatus of the turbocharger according to the first embodiment of the invention. Description will be given to the first embodiment.

The electronic control actuator 18 comprises an electronic control circuit section A1 and a driving section A2. The actual angle signal of an output shaft is fed back from the output side of the driving section A2 to the comparing device of the electronic control circuit section A1 through an angle sensor 19. In the electronic control circuit section A1, an angle signal converting device 20, a comparing device 21, a calculating device 22 constituted by a PID calculating section, a change-over switch 23 and a motor driving logic generating device 24 are sequentially connected, various communication information, particularly, the opening indication information of a vane 14c of the variable nozzle are fetched from the engine ECU 16 via the control signal line 17 based on the starting operation of the engine, and the same information or signals are subjected to a processing calculation and are thus output to the driving section A2 provided in a subsequent stage. The driving section A2 to be operated by the output signal comprises a motor driver 25 which is operated in response to the output signal of the motor driving logic generating device 24, a motor section 26 to be a driving source, a speed reduction mechanism 27 and an output shaft 28 of the electronic control actuator 18, and sequentially operates them.

The actual angle signal of the output shaft is detected as the rotation angle of the output shaft 28 by the angle sensor 19 and is introduced into the comparing device 21. The calculating device 22 provided on the output side of the comparing device 21 is constituted by a PID calculating section, for example, and serves to compare the target angle signal of the output shaft 28 with the actual angle signal of the output shaft 28 by the comparing device 21 and to integrate, differentiate and proportionally control them to carry out a fine processing calculation. Since such the devices are used, the responsiveness of the electronic control actuator 18 can be enhanced very greatly.

Next, the output of the electronic control actuator 18 is transmitted to the variable nozzle member of the turbocharger 14 through the lever 18a and the rod 18b, thereby controlling the opening of the vane 14c of the variable nozzle provided in the variable nozzle member.

According to the apparatus of the invention, thus, the rotation angle of the output shaft 28 coupled to the vane 14c of the variable nozzle is detected by the angle sensor 19, thereby outputting the actual angle signal of the output shaft, and the opening indication information of the vane 14c of the variable nozzle which is transmitted from the engine ECU 16 is converted into the target angle signal of the output shaft by the angle signal converting device 20, and both of the signals are compared with each other and the vane 14c of the variable nozzle is driven and controlled to have a target opening corresponding to a difference between both of the signals. Consequently, it is possible to obtain the variable nozzle control apparatus of the turbocharger in which the decision of the suitability of the opening of the vane 14c in the variable nozzle or a comparison processing can be automatically carried out, and a resolution can be enhanced and a control can be performed by a feedback signal.

Moreover, the load of the software of the engine ECU can be reduced and various hoses required for conventional apparatuses are not necessary, and the length of the control signal line can be decreased and a special countermeasure does not need to be taken against a noise. Furthermore, the size of the actuator 18 can be decreased so that the size of the whole apparatus can be reduced.

Second Embodiment

Figure 3:
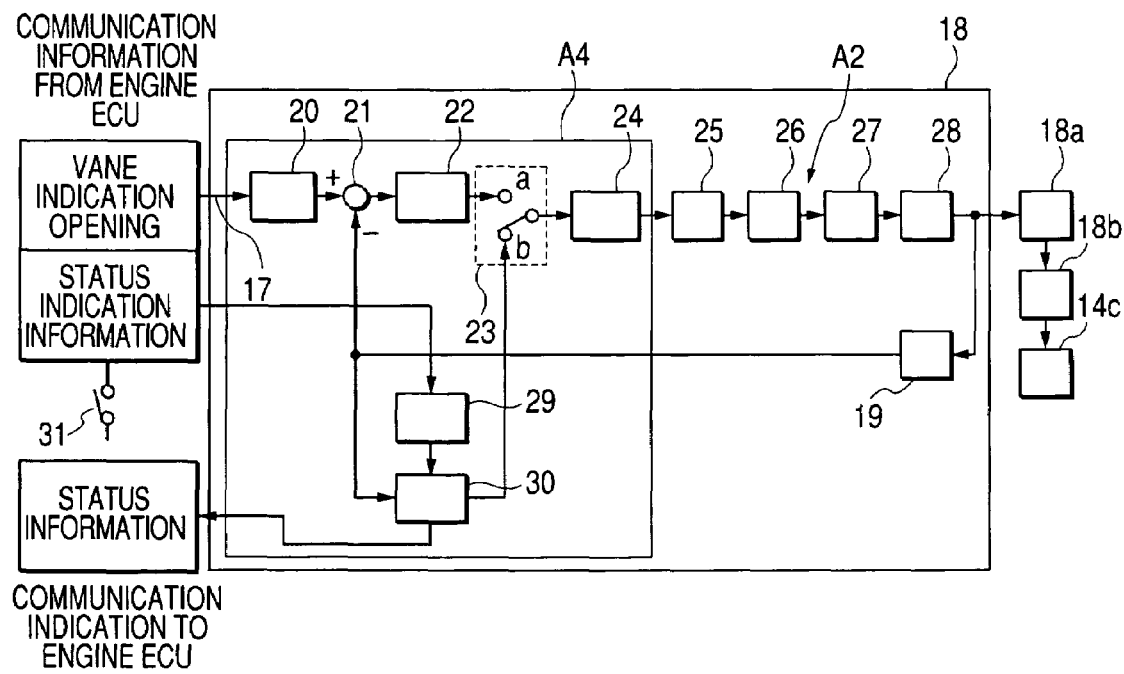
FIG. 3 is a block diagram showing the variable nozzle control apparatus of the turbocharger according to the invention, illustrating a second embodiment of the internal structure of the electronic control actuator.

FIG. 3 is a block diagram showing the variable nozzle control apparatus of the turbocharger according to the second embodiment of the invention. Description will be given to the second embodiment. FIG. 3 is a diagram showing a structure in which a function of causing the vane 14c of the variable nozzle to carry out a wiping operation is added to the structure of the block circuit in FIG. 2.

The electronic control actuator 18 comprises an electronic control circuit section A4 and the driving section A2. The driving section A2 and the other structures are the same as those in the first embodiment and description thereof will be omitted. Moreover, the structure of the electronic control circuit section A4 is the same as that of the electronic control circuit section A1 except that wiping command device and wiping processing device which will be described below are added. The electronic control circuit section A4 includes a wiping command device 29 and a wiping processing device 30. The wiping command device 29 outputs a wiping operation command signal for executing the wiping operation of the vane 14c over the whole operating region of the vane 14c of the variable nozzle provided in the variable nozzle member by status indication information transmitted from the engine ECU 16 based on the stop of the engine of a car upon receipt of an OFF signal transmitted from an engine key switch, that is, an ignition switch 31. The wiping processing device 30 introduces the wiping operation command signal into the motor driving logic generating device 24. The motor driver 25 rotates the motor section 26 in response to an output signal transmitted from the motor driving logic generating device 24, thereby executing the wiping operation of the vane 14c of the variable nozzle. When the wiping operation of the vane 14c of the variable nozzle is ended, the wiping processing device 30 transmits, as status information, a signal indicative of the end to the engine ECU 16.

In many cases, the vane 14c of the variable nozzle is usually operated within a part of a whole operating region having an opening angle of 0 to 100 degrees, for example, only an operating angle range having an opening angle of 30 to 60 degrees. In some cases, accordingly, soot adheres to or stays on the surface of a nozzle ring within the operating angle range other than the normal operating region of the vane 14c of the variable nozzle. According to the second embodiment, when the ignition switch 31 is OFF, the wiping operation for stopping the vane 14c of the variable nozzle in a full open position via a full closing position at least once is executed. Therefore, so-called soot sweeping is carried out and the operation of the vane 14c of the variable nozzle or the variable nozzle member can be smoothly carried out and a durability can be enhanced, and furthermore, the flow efficiency of an exhaust gas or the operation efficiency of the vane 14c itself of the variable nozzle can be improved and the opening of the vane 14c of the variable nozzle can be properly controlled.

The other structures and operations are almost the same as those in the first embodiment and description thereof will be omitted.

Since the variable nozzle control apparatus of the turbocharger according to the invention has the structure and operation described above, the following advantages can be obtained.

Third Embodiment

Figure 4:
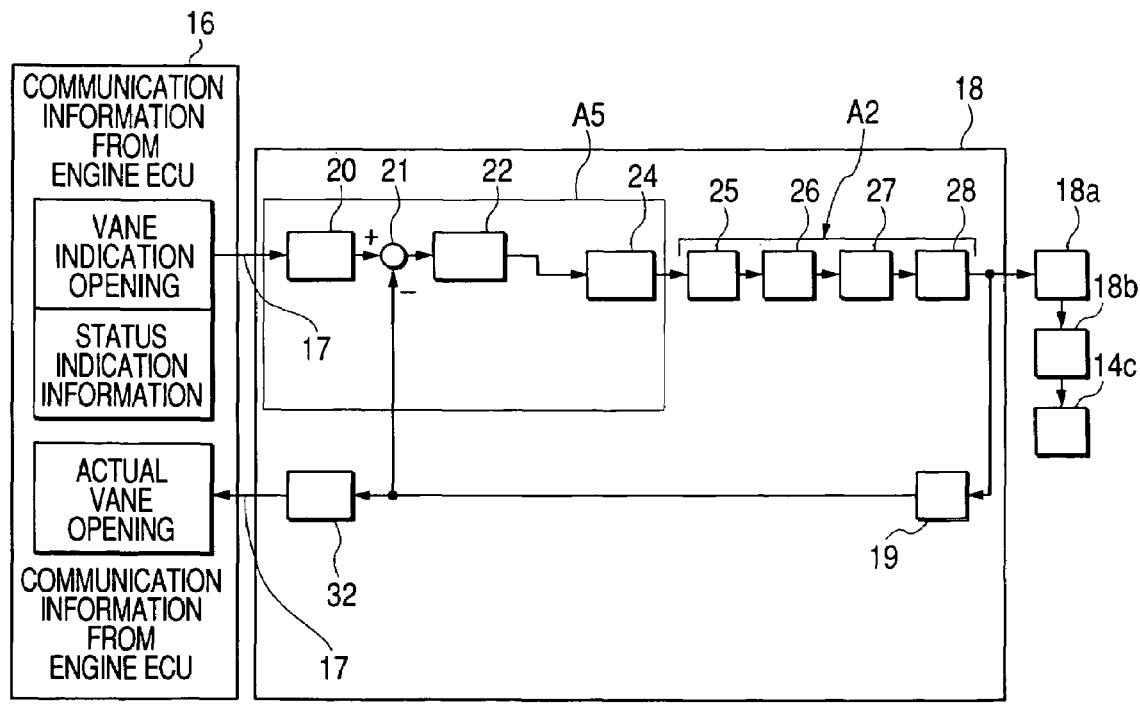
FIG. 4 is a block diagram showing a third embodiment of the variable nozzle control apparatus of the turbocharger according to the invention.

FIG. 4 shows is a block diagram showing the third embodiment of the variable nozzle control apparatus of the turbocharger according to the invention. Description will be given to the third embodiment.

The electronic control actuator 18 includes an electronic control circuit section A6 and a driving section A2 that is controlled and driven by the electronic control circuit section A5. The electronic control circuit section A5 includes an angle signal converting device 20 for introducing an indication signal for the opening of the vane of the variable nozzle through a control signal line 17, a comparing device 21 for comparing a target angle signal of the output shaft with an actual angle signal of the output shaft, a calculating device 22 constituted by a PID calculating section for carrying out integration, differentiation and proportional control to the output signal from the comparing device 21, a motor driving logic generating device 24 connected to an output side of the calculating device 22, and a communication signal converting device 32 which detects the actual angle signal of the output shaft and converts it to an actual vane opening signal. The driving section A2 includes a motor driver 25 operated by an output signal from the motor driving logic generating device 24 in the electronic control circuit section A5, and a motor section 26 rotated by an output signal from the motor driver 25, a speed reduction mechanism 27 for reducing a rotational speed of the motor section 26, the output shaft 28 of the electronic control actuator 18 coupled to the speed reduction mechanism 27, and an angle sensor 19 detecting a rotational angle of the output shaft 28.

Figure 7:
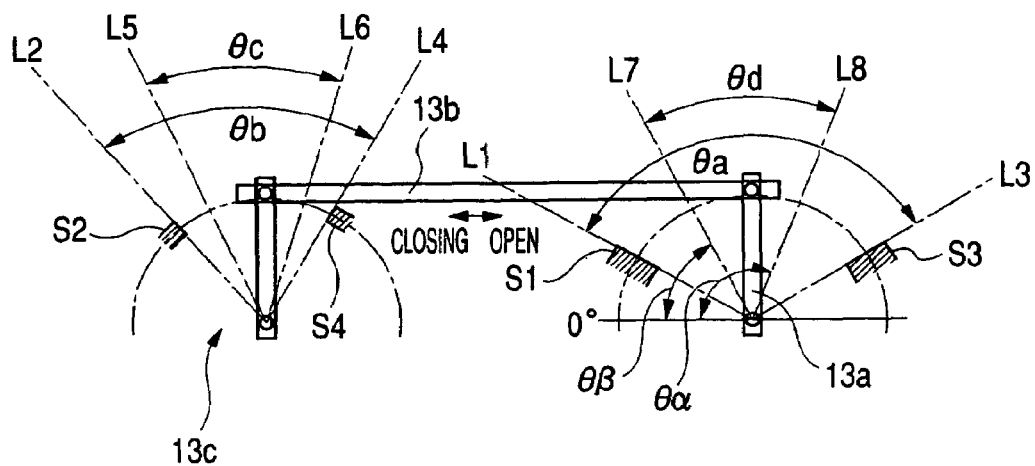
FIG. 7 is a relational operation diagram between the electronic control actuator and the variable nozzle of the turbocharger in the variable nozzle control apparatus of the turbocharger according to the invention.
Figure 8:
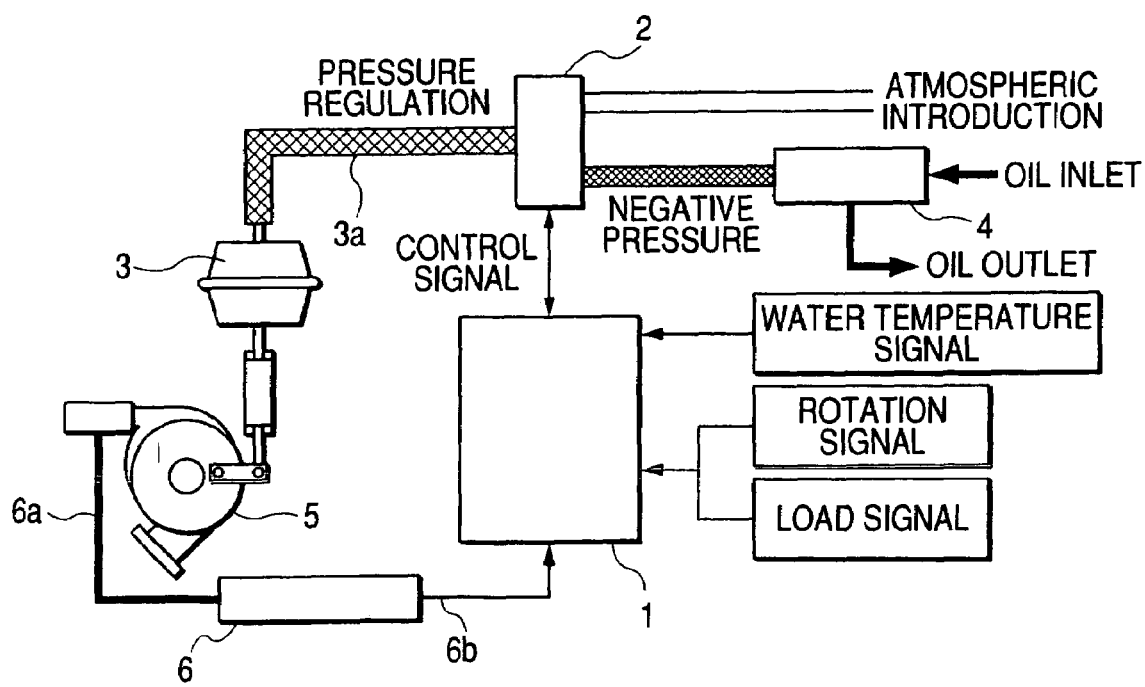
FIG. 8 is a diagram showing the structure of a variable nozzle control apparatus of a turbocharger according to a conventional example.
Figure 9:
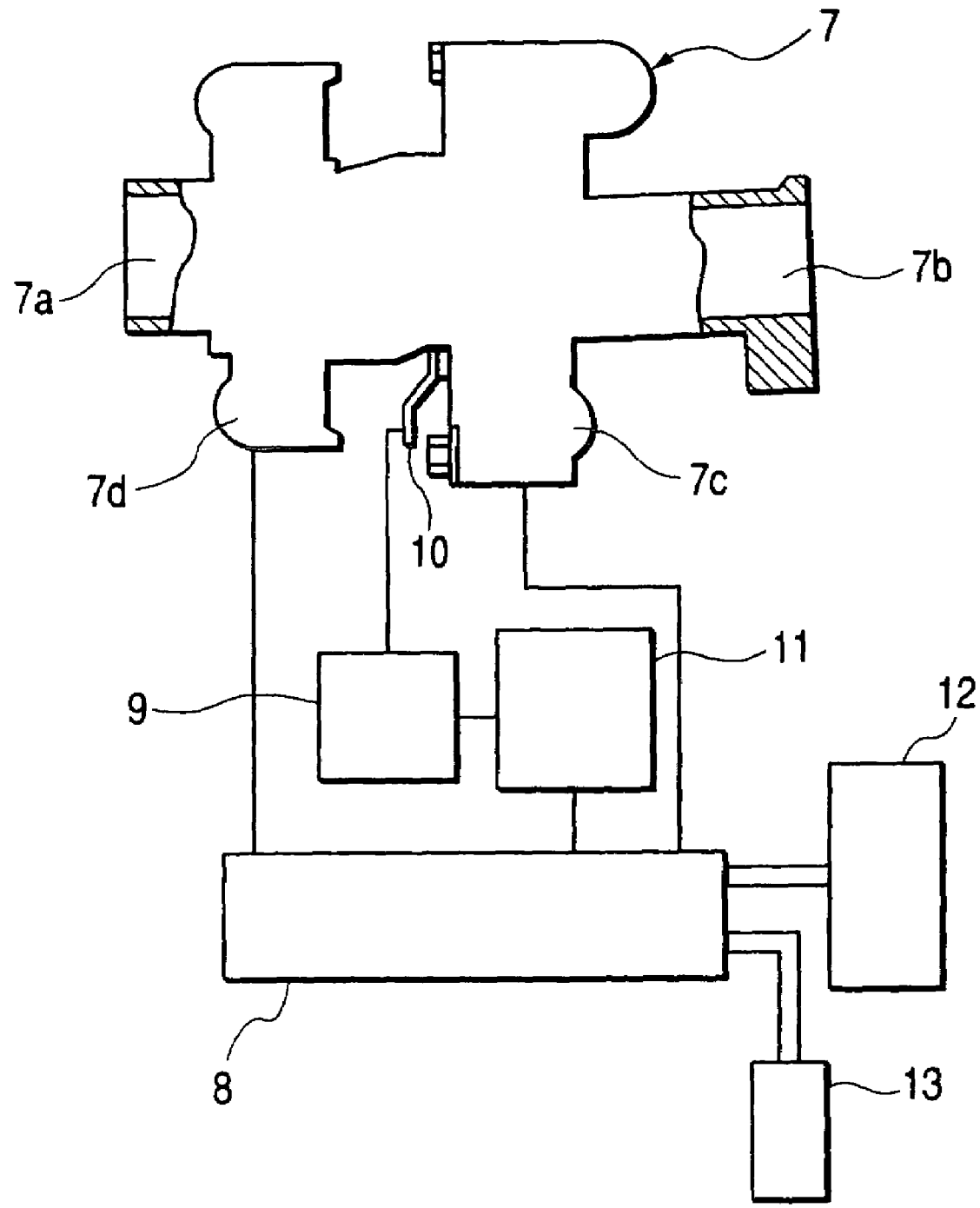
FIG. 9 is a diagram showing the structure of a variable nozzle control apparatus of a turbocharger according to another conventional example.

As shown in FIGS. 1 and 7, an end portion of a lever 18a is coupled to the output shaft 28 of the electronic control actuator 18 and the other end portion of the lever 18a is coupled to an end portion of a rod 18b. The other end portion of the rod 18b is coupled to a vane 14c of the variable nozzle of the turbocharger 14. In order to limit a rotational angle of the output shaft 28, namely, a total mechanical working range of the electronic control actuator 18, a working angle of the lever 18a is restricted by one stopper S1 and the other stopper S3 which are mechanically provided. Further, the total mechanical working range of the vane 14c of the variable nozzle, namely, a mechanical working angle of the variable nozzle of the turbocharger is restricted by one stopper S2 and the other stopper S4 which are mechanically provided.

The magnitude relationship between the total mechanical working range θa of the electronic control actuator 18 and the total mechanical working range θb of the vane 14c of the variable nozzle is set to be θa>θb. Here, the total mechanical working range θa of the electronic control actuator 18, is defined with an angle formed between a position L1 at which the lever 18a abuts with the one stopper S1 and a position L3 at which the lever 13a abuts with the other stopper S3, and the total mechanical working range θb of the vane 14c of the variable nozzle, is defined with an angle formed between a position L2 at which the vane 14c of the variable nozzle abuts with the one stopper S2, and a position L4 at which the vane 14c of the variable nozzle abuts with the other stopper S4. Accordingly, when the vane 14c abuts with the one stopper S2, the lever 18a does not abut with the one stopper S1 so as to form a clearance therebetween, and the vane 14c abuts with the other stopper S4, the lever 18a does not abut with the other stopper S3 so as to form a clearance therebetween.

The description is given to an operation in the third embodiment of the variable nozzle vane control apparatus of the turbocharger according to the invention.

The actual angle signal of the output shaft 28 is fed back from the output side of the driving section A2 to the comparing device 21 of the electronic control circuit section A5 through the angle sensor 19. In the electronic control circuit section A5, the angle signal converting device 20, the comparing device 21, the calculating device 22 constituted by the PID calculating section and the motor driving logic generating device 24 are sequentially connected. Various communication information, particularly, the opening indication information of the vane 14c of the variable nozzle are fetched from the engine ECU 16 via the control signal line 17 based on the starting operation of the engine, and the same information or signals are subjected to a processing calculation and are thus output to the driving section A2 provided in a subsequent stage. The driving section A2 to be operated by the output signal comprises the motor driver 25 to be a motor driving device which is operated in response to the output signal of the motor driving logic generating device 54, the motor section 26 to be a driving source, the speed reduction mechanism 27 and the output shaft 28 of the electronic control actuator 18, and sequentially operates them.

The actual angle signal of the output shaft is detected as the rotating angle of the output shaft 28 by the angle sensor 19 and is introduced into the comparing device 21 as well as the signal is sent to the engine ECU through the communication signal converting device 32 converting the actual angle signal to the actual vane opening signal. The calculating device 22 provided on the output side of the comparing device 21 is constituted by the PID calculating section, for example, and serves to compare the target angle signal of the output shaft 28 with the actual angle signal of the output shaft 28 by the comparing device 21 and to integrate, differentiate and proportionally control them to carry out a fine processing calculation. Since such means is used, the responsiveness of the electronic control actuator 18 can be enhanced very greatly.

Next, the output of the electronic control actuator 18 is transmitted to the vane 14c of the variable nozzle of the turbocharger 14 through the lever 18a and the rod 18b, thereby controlling the opening of the vane 14c of the variable nozzle provided in the variable nozzle member.

According to the apparatus of the invention, thus, the rotating angle of the output shaft 28 coupled to the vane 14c of the variable nozzle is detected by the angle sensor 19, thereby outputting the actual angle signal of the output shaft 28, and the opening indication information of the vane 14c of the variable nozzle which is sent from the engine ECU 16 is converted into the target angle signal of the output shaft 28 by the angle signal converting device 20, and both of the signals are compared with each other and the vane 14c of the variable nozzle is driven and controlled to have a target opening corresponding to a difference between both of the signals. Consequently, it is possible to obtain the variable nozzle control apparatus of the turbocharger in which the decision of the suitability of the opening of the vane 14c in the variable nozzle or a comparison processing can be automatically carried out, and a resolution can be enhanced and a control can be performed by a feedback signal.

Moreover, the load of the software of the engine ECU 16 can be reduced and various hoses required for conventional apparatuses are not necessary, and the length of the control signal line can be decreased and a special countermeasure does not need to be taken against a noise. Furthermore, the size of the actuator 18 can be decreased so that the size of the whole apparatus can be reduced.

Fourth Embodiment

Figure 5:
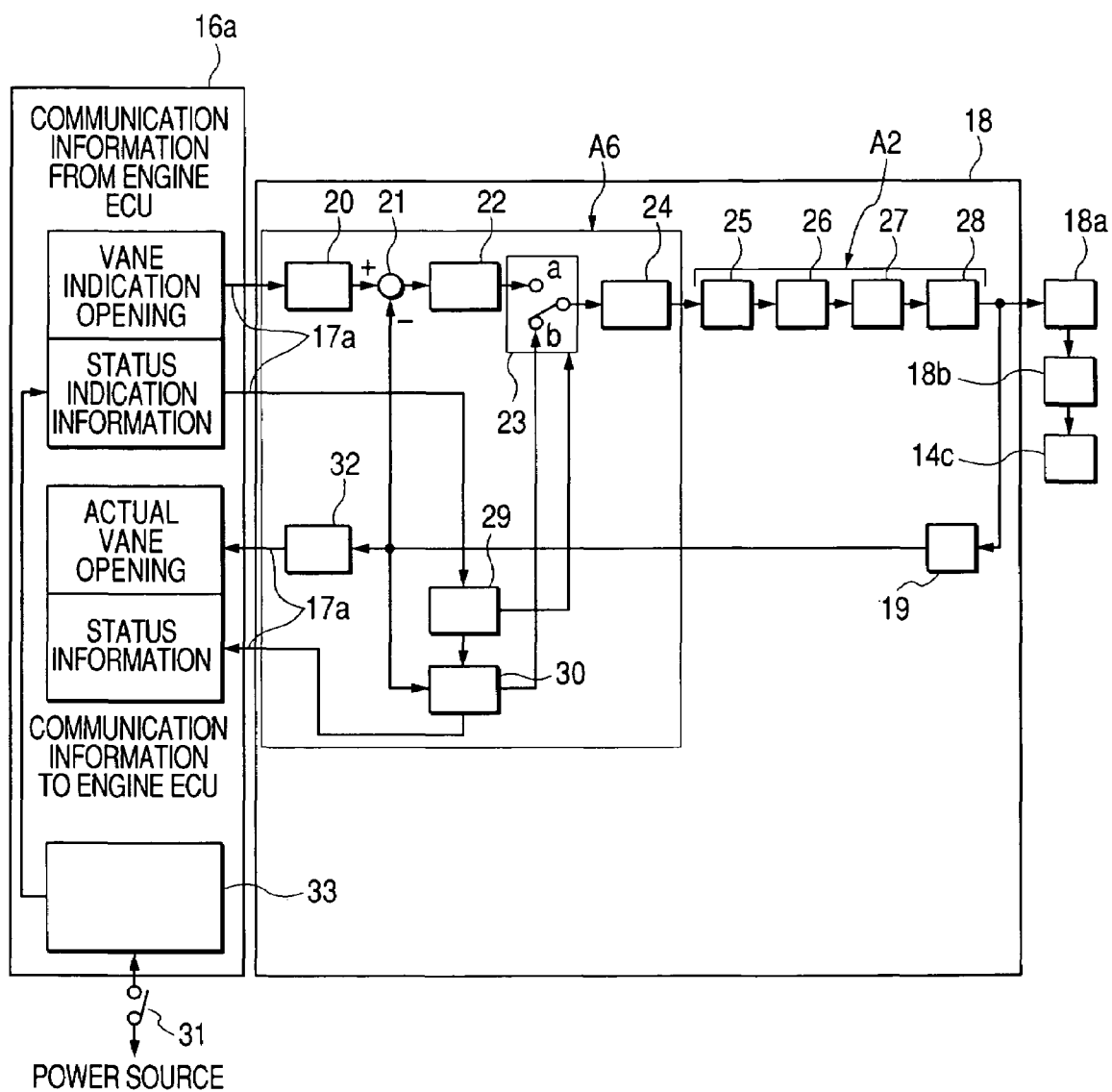
FIG. 5 is a block diagram showing a fourth embodiment of the variable nozzle control apparatus of the turbocharger according to the invention.

FIG. 5 is a block diagram showing the fourth embodiment of the variable nozzle control apparatus of the turbocharger according to the invention. FIG. 5 is a diagram showing a structure in which a function of causing the vane 14c of the variable nozzle to carry out a wiping operation is added to the structure of the block circuit in FIG. 4.

The electronic control actuator 18 comprises an electronic control circuit section A6 and the driving section A2. The driving section A2 and the other structures are the same as those in the third embodiment and description thereof will be omitted. The structure of the electronic control circuit section A6 is similar to that of the electronic control circuit section A5 in the third embodiment. However, a change-over switch 23 is interposed between the calculating device 22 and the motor driving logic generating device 24. 29 denotes a wiping command device which outputs a wiping operation command signal for executing a wiping operation to the vane 14c of the variable nozzle in accordance with a status indication information from the engine ECU 16a caused by the stop of the engine in the automobile, corresponding to the off signal from the ignition switch 31. 30 denotes a wiping processing device which receives the wiping operation command signal from the wiping command device 29, and outputs the signal to the motor driving logic generating device 24 through the change-over switch 23, so that the wiping operation is executed to the vane 14c of the variable nozzle. After the wiping operation to the vane 14c of the variable nozzle is terminated, the wiping processing device 30 transmits a signal indicating the termination of the wiping operation to the engine ECU 16a through the control signal line 17a as a status information.

The engine ECU 16a includes an ignition switch determination device 33 for determining and inputting on/off information from the ignition switch 31 which is connected to a power source on the automobile. The status information is output to the wiping command device 29 by the ignition switch determination device 33. The fourth embodiment is configured as described above.

Next, the description will be given to the operation of the fourth embodiment in the variable nozzle control apparatus of the turbocharger according to invention.

In many cases, in a variable nozzle control apparatus, the vane 14c of the variable nozzle is usually operated within a part of the total mechanical working range θb (e.g. the total working range of 80° from 0° of the opening angle corresponding to the position L2, to 80° of the opening angle corresponding to the position L4). For example, the vane 14c of the variable nozzle may be operated often within a working range of 40° defined from 20° of the opening angle corresponding to the position L5, to 60° of the opening angle corresponding to the position L6. In some cases, accordingly, soot adheres to or stays on the surface of a nozzle ring within the operating angle range other than the normal operating range of the vane 14c of the variable nozzle. According to the fourth embodiment, when the ignition switch 31 is OFF, the wiping operation for stopping the vane 14c of the variable nozzle in a full open position via a full closing position at least once is executed. Therefore, so-called soot sweeping is carried out. Specifically, corresponding to the off signal from the ignition switch 31, the status information from the engine ECU 16a is introduced to the wiping command device 29. The wiping operation command signal is output from the wiping command device 29, and the wiping processing device 30 receiving the wiping operation command signal transmits an output signal to the motor driving logic generating device 24 through the change-over switch 23, whereby the driving section A2 is operated to execute the wiping operation to the vane 14c of the variable nozzle for the soot sweeping.

Figure 6:
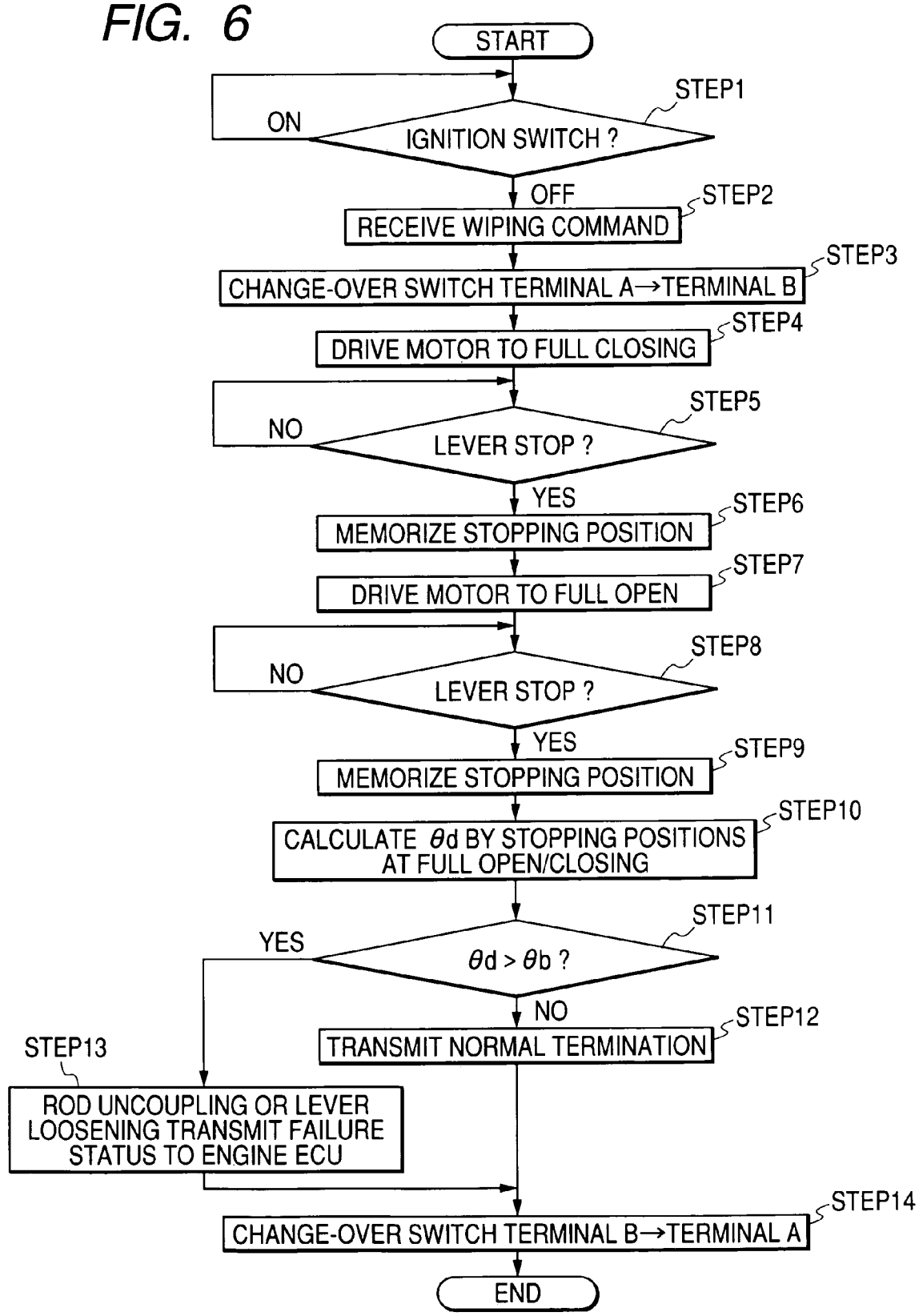
FIG. 6 is an operation flow chart corresponding to the fourth embodiment of the variable nozzle control apparatus of the turbocharger according to the invention.

Next, detection operation of the unusual state such as uncoupling of the rod and loosening of the lever of the electronic control actuator 18 is described in detailed with reference to FIG. 6 in which an operational flow is shown and FIG. 7 in which relational operation diagram between the electronic control actuator and the variable nozzle of the turbocharger, indicating the relationship between the total mechanical working angle θa of the electronic control actuator 18 and the total mechanical working angle θb of the vane 14c of the variable nozzle of the turbocharger 14.

Turning off the ignition switch (off operation) after termination of driving the automobile, the off signal is output from the ignition determination device 33 (step 1), the engine ECU 16a introduce this output signal to the wiping command device 29 as a status information. Then the wiping command device 29 performs a reception of a command (step 2). The wiping command device 29 introduces the signal to the change-over switch 23, thereby switching the contact from the terminal a to the terminal b (step 3).

Incidentally, the change-over switch 23 is constructed with a non-contact electronic switch device. The wiping processing device 30 outputs a signal for activating the motor driving to the motor driving logic generating device 24 through the terminal b in the change-over switch 23. Then the motor driver 25 is activated so that the motor section 26 is rotated.

At this time, the motor section 26 is driven so that the output shaft 28 of the electronic control actuator 18, namely, the lever 18a is rotated in a direction toward full closing state (step 4). When the vane 14c is reached at the position L2, that is, the vane 14c of the variable nozzle abuts with the one stopper S2, the vane 14c of the variable nozzle is retained, and accordingly, the lever 18a on the electronic control actuator 18 is stopped at a position L7. Then the position L7 is identified and memorized for the working angle θβ (steps 5, 6).

After the step 6, the motor driver 25 operates the motor section 26 in reverse so that the output shaft 28 of the electronic control actuator 18, namely, the lever 18a is driven in a direction toward the full-open state (step 7). Reaching the vane 14c of the variable nozzle at the position L4, that is, the vane 14c abuts with the other stopper S4, the vane 14c of the variable nozzle is retained, and accordingly, the lever 18a on the electronic control actuator 18 is stopped at a position L8. Then the position L8 is identified and memorized for the working angle θα (steps 8, 9).

Thus, the wiping processing device 30 calculates an actual working angle θd of the output shaft 28 of the electronic control actuator 18 by the equation θα−θβ=θd based on the memorized working angles θα and θβ at the stopped positions of the lever 18a in the opening and closing operations (step 10). Then the actual working angle θd of the output shaft 28 in the electronic control actuator 18 and the total mechanical working angle θb of the variable nozzle of the turbocharger are compared (step 11). If the comparison by the wiping processing device 30 is given as θd >θb, the wiping processing device 30 determines that an unusual state such that the rod 18b is uncoupled, or the lever 18a is loosened, is caused, and the wiping processing device 30 transmits a fail signal indicating such the state to the engine ECU 16a (step 12).

Further, if the comparison by the wiping processing device 30 is given as θd≦θb, the wiping processing device 30 transmits a signal indicating a normal termination to the engine ECU 16a (step 13). The engine ECU provides a status indication so that a switching signal is introduced from the wiping command device 29 to the change-over switch 23, thereby switching the terminal b to the terminal a (step 14).

Incidentally, according to the fourth embodiment, the usual operations of the output shaft 28 of the electronic control actuator 18 and of the variable nozzle, the following equation is satisfied:

Total mechanical working range θa of the electronic control actuator >Total mechanical working range θb of the vane of the variable nozzle of the turbocharger >Usual working range θc of the variable nozzle of the turbocharger.

For example, θa is 120°, θb is 80°, and θc is 40°.

As described above, by the fourth embodiment, the detection for the unusual state such as uncoupling of the rod and loosening of the lever of the electronic control actuator 18 can be performed as well as performing a soot sweeping on the nozzle ring, by wiping the vane 14c of the variable nozzle of the turbocharger between the full closing position to the full-open position. Further, the operation of the vane 14c of the variable nozzle can be smoothly carried out and a durability can be enhanced, and furthermore, the flow efficiency of an exhaust gas or the operation efficiency of the vane 14c itself of the variable nozzle can be improved and the opening of the vane 14c of the variable nozzle can be properly controlled.

According to the first aspect of the invention, the rotation angle of the output shaft coupled to the vane of the variable nozzle is detected by the angle sensor to output the actual angle signal of the output shaft, and the opening indication information of the vane of the variable nozzle transmitted from the engine ECU is converted into the target angle signal of the output shaft by the angle signal converting device, both of the signals are compared with each other and the vane of the variable nozzle is driven according to a difference between both of the signals, thereby controlling the vane to have a target opening. Consequently, it is possible to obtain a variable nozzle control apparatus of a turbocharger capable of automatically carrying out the decision of the suitability of the opening of the vane in the variable nozzle or a comparison processing, enhancing a resolution, and performing a control in response to a feedback signal. Moreover, it is possible to obtain such an advantage that the size of the actuator can be decreased so that the size of the whole apparatus can be reduced.

According to the second aspect of the invention, in addition to the advantages according to the first aspect of the invention, the vane is operated up to the full open position via the full closing position at least once in the whole operating region of the vane of the variable nozzle by the status indication information transmitted from the engine ECU based on the stop of the engine according to the OFF operation of the ignition switch. Therefore, it is possible to obtain such an advantage that so-called soot sweeping can be executed, the operation of the vane of the variable nozzle can be smoothly carried out and a durability can be enhanced. At the same time, there is an advantage that the detection for the unusual state such as uncoupling of the rod and loosening of the lever of the electronic control actuator can be performed.

What is claimed is:

1. An electronic controller for a variable nozzle control apparatus comprising:
   an engine electronic control unit for identifying an operating situation of an engine and outputting a vane opening signal; and
   an electronic control actuator for controlling an opening of a vane in a turbocharger in response to the vane opening signal, wherein the electronic control actuator comprises:
      an angle sensor that outputs an actual angle signal that corresponds to a rotation angle of an output shaft that drives said vane;
      an electronic control circuit that receives said vane opening signal and that provides an output signal based upon the vane opening signal and the actual angle signal; and
      a driver that drives the output shaft based upon the output signal,
   wherein the electronic control circuit comprises a wiping processor that stores at least one of a first working angle of the output shaft corresponding to a vane fully closed state and a second working angle of the output shaft corresponding to a vane fully open state.

2. The controller of claim 1, wherein said electronic control actuator further comprises a communication signal converting device for converting the actual angle signal to an actual vane opening signal and for sending the actual vane opening signal to the engine electronic control unit.

3. The controller of claim 1, wherein said engine electronic control unit further comprises an ignition switch determination device for determining the on/off status of an ignition switch.

4. The controller of claim 1, wherein the electronic control circuit further comprises:
   a wiping command device for outputting a command signal to execute a wiping operation for causing the vane to be stopped in a full open position via a full closing position at least once in a full operating region of the vane of the variable nozzle by a status indication information transmitted from the engine electronic control unit based on a stop of the engine by an OFF operation of an ignition switch,
   wherein said wiping processor introduces the command signal of the wiping command device into the motor driving logic generating device.

5. A variable nozzle control apparatus adapted for a turbocharger in an engine comprising:
   a variable nozzle having a vane;
   an engine electronic control unit for identifying an operating situation of the engine by detected outputs of sensors in the engine and outputting a control signal; and
   an electronic control actuator for controlling an opening of the vane in response to the control signal transmitted from the engine electronic control unit,
   wherein the electronic control actuator includes
      an electronic control circuit section for receiving an opening indication information of the vane from the engine electronic control unit and outputting an output signal;
      a driving section for receiving the output signal from the electronic control circuit section and driving the vane of the variable nozzle through an output shaft;

an angle sensor for detecting a rotation angle of the output shaft to output an actual angle signal of the output shaft to the electronic control circuit; and a communication signal converting device for converting the actual angle signal to an actual vane opening signal, wherein the electronic control circuit section includes an angle signal converting device for converting the opening indication information of the vane into a target angle signal of the output shaft;

a comparing device for comparing the target angle signal from the angle signal converting device with the actual angle signal from the angle sensor, and outputting an indication signal corresponding to a difference between the target signal and the actual signal;

a calculating device for carrying out a calculation processing over the indication signal transmitted from the comparing device; and a motor driving logic generating device for inputting the output signal to a motor driver of the driving section, and wherein the driving section includes the motor driver for receiving the output signal of the electronic control circuit and outputting a driving signal; and a motor section driven by the driving signal and coupled to the output shaft through a reduction gear mechanism, and the output shaft driving the vane of the variable nozzle.

6. A variable nozzle control apparatus adapted for a turbocharger in an engine comprising:

a variable nozzle having a vane;

an engine electronic control unit for identifying an operating situation of the engine by detected outputs of sensors in the engine and outputting a control signal; and an electronic control actuator for controlling an opening of the vane in response to the control signal transmitted from the engine electronic control unit, wherein the electronic control actuator includes an electronic control circuit section for receiving an opening indication information of the vane from the engine electronic control unit and outputting an output signal;

a driving section for receiving the output signal from the electronic control circuit section and driving the vane of the variable nozzle through an output shaft;

an angle sensor for detecting a rotation angle of the output shaft to output an actual angle signal of the output shaft to the electronic control circuit; and a communication signal converting device for converting the actual angle signal to an actual vane opening signal, wherein the electronic control circuit section includes an angle signal converting device for converting the opening indication information of the vane into a target angle signal of the output shaft;

a comparing device for comparing the target angle signal from the angle signal converting device with the actual angle signal from the angle sensor, and outputting an indication signal corresponding to a difference between the target signal and the actual signal;

a calculating device for carrying out a calculation processing over the indication signal transmitted from the comparing device; and a motor driving logic generating device for inputting the output signal to a motor driver of the driving section, and wherein the electronic control circuit section further comprises:

a wiping command device for outputting a command signal to execute a wiping operation for causing the vane to be stopped in a full open position via a full closing position at least once in a full operating region of the vane of the variable nozzle by a status indication information transmitted from the engine electronic control unit based on a stop of the engine by an OFF operation of an ignition switch; and a wiping processing device for introducing the command signal of the wiping command device into the motor driving logic generating device.

7. The variable nozzle control apparatus according to claim 6, wherein said communication signal converting device sends the actual vane opening signal to the engine electronic control unit.

8. A variable nozzle control apparatus according to claim 4, wherein the wiping processing device introduces the command signal into the motor driving logic generating device through a change-over switch.

9. A variable nozzle control apparatus adapted for a turbocharger in an engine comprising:

a variable nozzle having a vane;

an engine electronic control unit for identifying an operating situation of the engine by detected outputs of sensors in the engine and outputting a control signal; and an electronic control actuator for controlling an opening of the vane in response to the control signal transmitted from the engine electronic control unit, wherein the electronic control actuator includes an electronic control circuit section for receiving an opening indication information of the vane from the engine electronic control unit and outputting an output signal;

a driving section for receiving the output signal from the electronic control circuit section and driving the vane of the variable nozzle through an output shaft;

an angle sensor for detecting a rotation angle of the output shaft to output an actual angle signal of the output shaft to the electronic control circuit; and a communication signal converting device for converting the actual angle signal to an actual vane opening signal, wherein the electronic control circuit section comprises:

an angle signal converter that converts the opening indication information of the vane from the engine electronic control unit into a target angle signal of the output shaft; and a comparing device that compares the target angle signal with the actual angle signal and that outputs an indication signal corresponding to a difference between the target signal and the actual signal.

10. A variable nozzle control apparatus adapted for a turbocharger in an engine comprising:

a variable nozzle having a vane:

an engine electronic control unit for identifying an operating situation of the engine by detected outputs of sensors in the engine and outputting a control signal; and an electronic control actuator for controlling an opening of the vane in response to the control signal transmitted from the engine electronic control unit, wherein the electronic control actuator includes
- an electronic control circuit section for receiving an opening indication information of the vane from the engine electronic control unit and outputting an output signal;
- a driving section for receiving the output signal from the electronic control circuit section and driving the vane of the variable nozzle through an output shaft;
- an angle sensor for detecting a rotation angle of the output shaft to output an actual angle signal of the output shaft to the electronic control circuit; and
- a communication signal converting device for converting the actual angle signal to an actual vane opening signal, wherein the electronic control circuit section comprises a wiping command device that outputs a command signal to execute a wiping operation.

11. The variable nozzle control apparatus of claim 10, wherein the electronic control circuit section further comprises a wiping processing device that introduces the command signal from the wiping command device into the driving section.

12. The apparatus of claim 11, wherein said wiping processing device stores at least one of a first working angle of the output shaft corresponding to a vane fully closed state and a second working angle of the output shaft corresponding to a vane fully open state.

13. The apparatus of claim 12, wherein said wiping processing device calculates an actual working angle of the output shaft based upon said first working angle and said second working angle.

14. The apparatus of claim 13, wherein said wiping processing device compares said actual working angle of said output shaft to a predetermined total mechanical working angle of said vane.

15. The apparatus of claim 14, wherein said wiping processing device transmits a fail signal to the engine electronic control unit if the actual working angle is greater than said predetermined total mechanical working angle.

16. The apparatus of claim 14, wherein said wiping processing device transmits a normal signal to the engine electronic control unit if the actual working angle is less than or equal to said predetermined total mechanical working angle.

* * * * *